(No Model.)

N. KROTSCH.
PRESSURE INDICATOR AND REGULATOR.

No. 247,767.                    Patented Oct. 4, 1881.

WITNESSES

INVENTOR
Norbert Krotsch
by
C. S. Whitman
ATTORNEYS.

UNITED STATES PATENT OFFICE.

NORBERT KROTSCH, OF MANITOWOC, WISCONSIN, ASSIGNOR OF ONE-HALF TO LOUIS KUNZ, OF SAME PLACE.

PRESSURE INDICATOR AND REGULATOR.

SPECIFICATION forming part of Letters Patent No. 247,767, dated October 4, 1881.

Application filed March 26, 1881. (No model.)

*To all whom it may concern:*

Be it known that I, NORBERT KROTSCH, a citizen of the United States, residing at the city of Manitowoc, in the county of Manitowoc and State of Wisconsin, have invented a new and useful Pressure Indicator and Regulator to be used in the manufacture of beer and other malt-liquors, of which the following is a specification.

My invention relates to improvements in an instrument or apparatus for indicating and regulating the pressure of the gases generated in vessels containing beer or other malt-liquors; and the objects of my improvement are, first, to indicate the amount of said pressure, and, secondly, to reduce or regulate the same to any amount or degree of pressure desired. I attain these objects by the mechanism illustrated in the accompanying drawings, in which—

Figure 1:
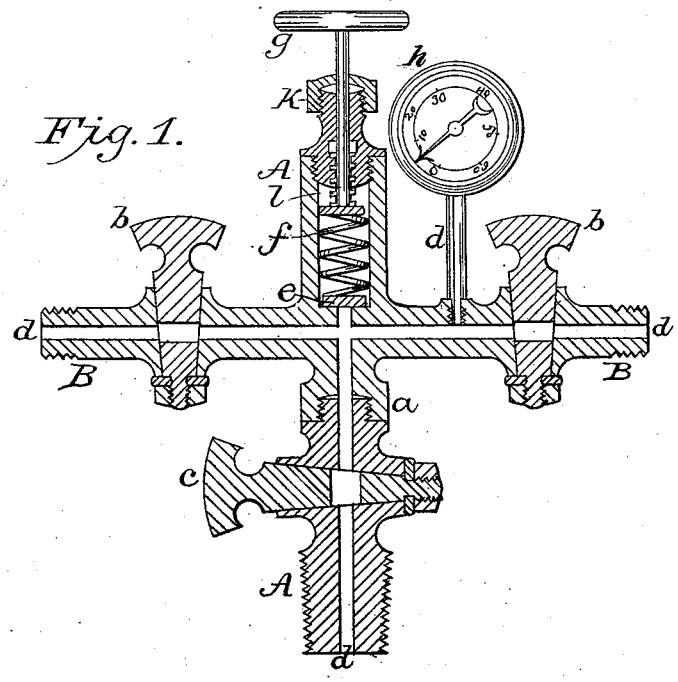
Figure 2:
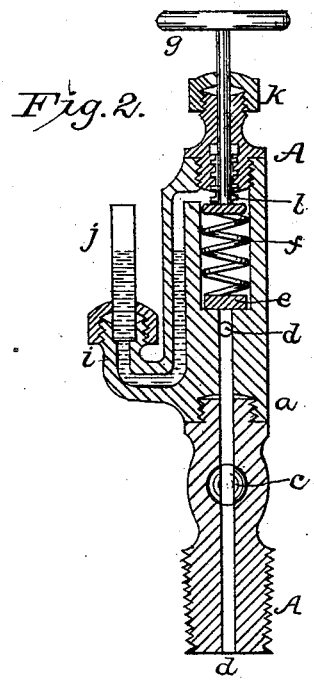

Figure 1 is a vertical side-view section of the entire instrument or apparatus, and Fig. 2 an end-view section of the same.

Similar letters refer to similar parts throughout the several views.

A A represent a stem or pipe provided with a stop-cock, $c$, and a valve and gas chamber, $l$, to be inserted in the vessel containing beer or other malt-liquor, which stem may be made in two sections or parts with a screw-joint, as at $a$, or entire, as may be preferred.

B B are branches of the stem or pipe, and are provided with stop-cocks $b$ $b$.

$d$ $d$ are tubes or passages, through which the gas may escape from the vessel or vessels.

$h$ is a gage for indicating the pressure of the gas.

$e$ is a valve, a little less in diameter than the chamber $l$, in which it is placed, which closes the tube $d$, the resistance of which valve to the pressure of the gas in the tube is regulated by means of the spiral spring $f$, to which the valve is attached, and the hand-screw $g$.

$i$ is a tube for the escape of the gas after it passes the valve $e$, which may be designated as a spring-valve.

$j$ is a cylinder, of glass or other suitable material, to be partially filled with water in order to exclude air from the tube $i$; and $k$ is a stuffing-box for the hand-screw $g$.

The operation of the instrument is as follows, to wit: Screw down the valve so as to resist a greater pressure of gas than is required, close the stop-cocks $b$ and $c$, screw the instrument into the vessel; then open the stop-cock $c$, and if the gage indicates a pressure greater than is desired, release the valve until the gage shows the required pressure. Then adjust the valve so that no gas shall escape below that pressure, after which the pressure will remain stationary at the point to which it has been adjusted, all excess of pressure being relieved by the automatic action of the spring-valve $e$.

By providing several such sections of the stem A as that represented below $a$, and inserting them into as many different vessels, and then connecting them by means of pipes or hose to one of the branches B and opening the stop-cock of that branch, the pressure in all the vessels can be regulated and equalized at the same time by the use of only one complete instrument, which would obviate the expense of an entire instrument for each vessel, and at the same time would, it is believed, benefit the contents of any vessel in which the required pressure had not been generated spontaneously.

To draw off the contents of the vessel into which the instrument is inserted when more than one vessel is connected with it, close the stop-cock in the branch with which the connection is made and open the stop-cock in the other branch, to let in air to cause the proper flow, when necessary, attaching, if thought advisable, a pipe or hose to that branch through which to draw fresh air from outside of the cellar or vault.

By having the L-shaped tube communicating with the upper end of the valved chamber $l$, it will be noticed that the steam escaping by the valve as its pressure becomes sufficient to lift it will find an immediate outlet from the aforesaid chamber, and be received and condensed or held in said tube, which is sealed at its outer end.

What I claim, and desire to secure by Letters Patent, is—

In a pressure-regulator, the tube A, having the valved or cocked branches B, provided with a pressure-indicator, $h$, and the chamber $l$, having the spring-pressure valve $e$ at its lower end, and the L-shaped sealed tube $i$ communicating with its upper end, substantially as and for the purpose set forth.

NORBERT KROTSCH.

Witnesses:
S. A. WOOD,
LOUIS KUNZ.